April 6, 1971            A. C. IHRIG            3,573,890

HEATED DELIVERY SYSTEM FOR SHEET GLASS

Filed Dec. 14, 1967            2 Sheets-Sheet 1

INVENTOR.
Allen C. Ihrig
BY
William D. Foshick
AGENT

April 6, 1971  A. C. IHRIG  3,573,890
HEATED DELIVERY SYSTEM FOR SHEET GLASS
Filed Dec. 14, 1967  2 Sheets-Sheet 2

INVENTOR.
Allen C. Ihrig
BY William D. Fosdick
AGENT

United States Patent Office 3,573,890
Patented Apr. 6, 1971

3,573,890
HEATED DELIVERY SYSTEM FOR SHEET GLASS
Allen C. Ihrig, Corning, N.Y., assignor to
Corning Glass Works, Corning, N.Y.
Filed Dec. 14, 1967, Ser. No. 690,613
Int. Cl. C03b 13/00
U.S. Cl. 65—90          2 Claims

ABSTRACT OF THE DISCLOSURE

A system for delivering a sheet of molten glass from a forehearth. The system includes a channel having as its base a downwardly inclined platinum-lined delivery lip with heated side portions and having an internally heated platinum tube at its discharge end. A plurality of burners direct heat to glass in the vicinity of the delivery lip, and a row of radiant heaters below the platinum tube and its glass discharge side heat the tube to minimize heat loss from beneath. Additional heaters are located in the sidewalls of the channel.

BACKGROUND OF THE INVENTION

This invention relates to the delivery of sheet glass in an over-the-lip type delivery system. In such systems glass is fed in a horizontally elongated stream over a delivery lip and through a pair of forming rollers.

There is a need for glass in the region of the lip to cool to a temperature lower than that of the glass in the forehearth, in order to permit satisfactory rolling. In the past, burners have been placed above the glass stream in the vicinity of the lip in order to regulate heat loss from the glass and prevent undue increases in glass viscosity and their adverse effect on the forming process. Recently there has been developed a family of glass-ceramics, such as those disclosed in U.S. Pat. 2,920,971, to S. D. Stookey. The characteristics of these glass-ceramics are such that at optimum forming viscosities the temperatures of such materials are very close to the glass liquidus. Consequently, there is increased danger of devitrification of the glass, with its resultant deleterious effect on the rolling operation. Due to the delicate balance required to maintain viscosity at a satisfactory value, while avoiding reduction in temperature below the liquidus, it is necessary to regulate the temperature of all the molten glass, which is subsequently to be heat-treated to form glass-ceramic, within a narrow range. It has been found that the application of heat only to the upper surface of the glass is not adequate for this purpose.

Accordingly, it is an object of the present invention to provide a heating system for an over-the-lip delivery system which will permit precise and selective temperature control of glass passing thereover.

SUMMARY OF THE INVENTION

According to the invention, a standard over-the-lip delivery system is modified by the addition of heating elements in the lip at each side thereof and in the sidewallas of the channel. Further improvement results from the location of a heater extending along the discharge end of the lip. The heated side lip portions counteract the tendency of the glass to cool more at its edges than in the center. The heater extending along the discharge end of the lip permits regulation of heat losses and maintains the glass-atmosphere-lip interface at a temperature higher than the glass liquidus. Thus, a greater uniformity of temperature is maintained throughout the flowing glass, and the danger of localized portions of the glass being either at too low or too high viscosities for proper forming or cold enough to devitrify is minimized.

DESCRIPTION OF THE PREFERRED EMBODIMENT

Figure 1:
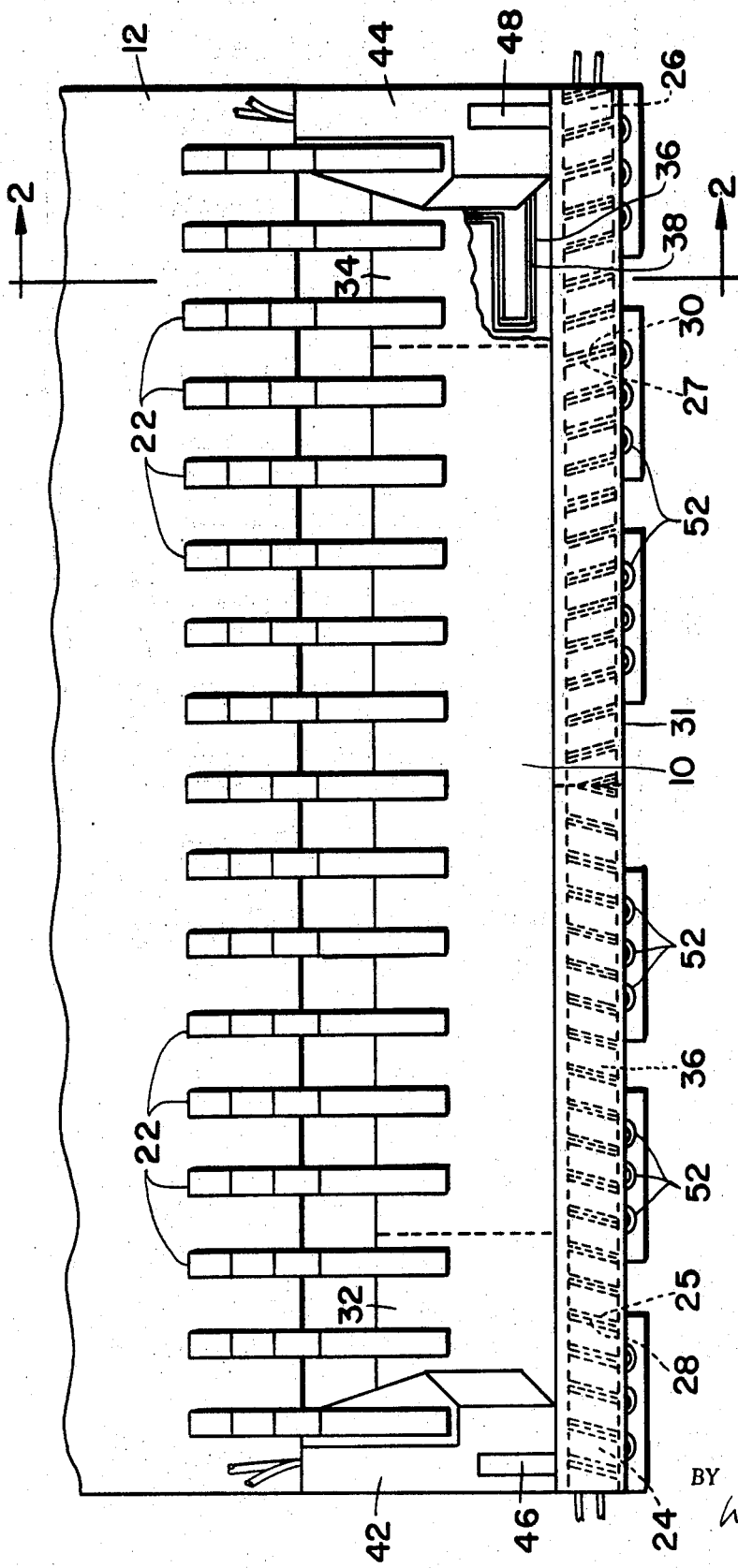
FIG. 1 is an end view of an over-the-lip delivery system incorporating heating means according to the invention.
Figure 3:
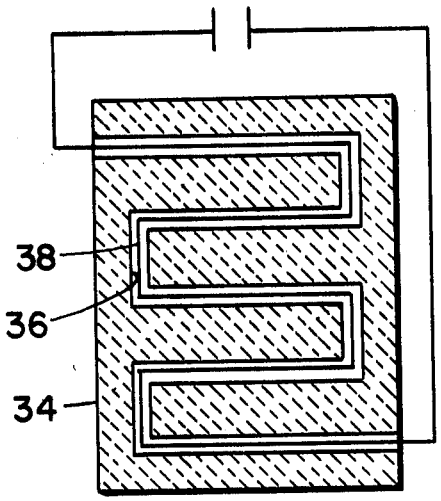
FIG. 3 is a sectional view taken on line 3—3 of FIG. 2.
Figure 2:
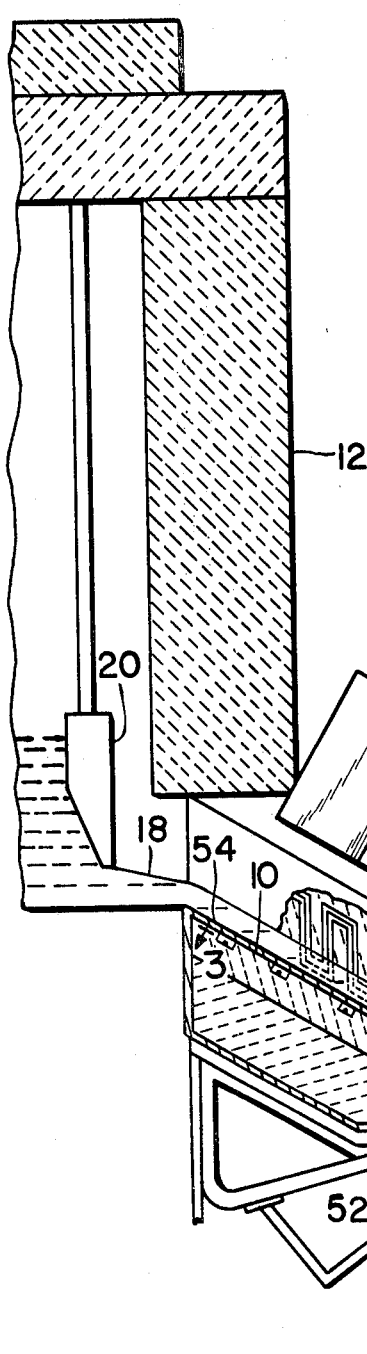
FIG. 2 is a sectional view taken on line 2—2 of FIG. 1.

A delivery system according to the present invention comprises an inclined delivery lip 10 leading from forehearth 12 to forming rollers 14 and 16. Molten glass 18 passes under gate 20, down the inclined lip, between the rollers and subsequently to an annealing lehr. A plurality of gas burners 22 are located above the lip and supply heat directly to the upper surface of the glass passing thereunder. Extending across the discharge end of the lip is a stationary heater comprising two refractory tubes 24 and 26 having helical grooves 25 and 27 formed in their outer surfaces. Platinum resistance heating wires 28 and 30 are located in the respective grooves, and tubes 24 and 26 are encased in platinum tube 31. At each side of the lip are two refractory side lip portions 32 and 34 having formed therein zig-zag grooves in which resistance heating wires are located. The construction of side portion 34 is illustrated in FIG. 3. It will be seen that a zig-zag groove 36 is provided with a resistance heating wire 38. Side portion 32 is identical with side portion 34. Sidewalls 42 and 44, which are shaped like, and function in the manner of, the impeder blocks described in applicant's U.S. Pat. 3,345,150, are, in turn, provided with heaters 46 and 48 comprising resistance heating elements, such as wire 50 of FIG. 2, located in a groove in a refractory block inserted in the sidewall. In order further to regulate heat losses at the glass-atmosphere-platinum tube interface 51, a plurality of stationary radiant heating elements 52 are located behind and below the platinum tube, thereby assisting in maintaining the temperature at the interface above the glass liquidus.

The entire lip is enclosed within a platinum sheath 54, the interior of which is continuously maintained under a vacuum in order to maintain the platinum tightly against the underlying refractory in the manner described in U.S. Pat. 3,355,793, to Burns et al.

It will be seen that the delivery system of the invention provides substantial heat to the bottom surface of molten glass passing therethrough, particularly in the side areas, where cooling tends to be greatest. In previous systems where heat has been suppled only from above, it has been necessary to maintain the upper surface of the glass at temperatures higher than desired in order to maintain the lower areas at adequate temperatures. In the present system, since heat is directed at the lower portions of the glass, undesirably high upper and central temperatures are not required.

Inasmuch as the foregoing description has been provided solely as that of a preferred embodiment of the invention, it is intended that the scope of the present invention be limited only by the scope of the appended claims.

What is claimed is:
1. In a glass delivery system for delivering a sheet of molten glass from a container thereof, said delivery system comprising sidewalls and a delivery lip located between said sidewalls and forming together therewith a channel for the flow of molten glass, said delivery lip having an outwardly and downwardly inclined upper surface with lip side portions extending along said sidewalls, said delivery lip terminating in a discharge end, with heating means extending along said delivery lip discharge end between said sidewalls for controlling the transfer of heat between said delivery lip discharge end and the lower surface of said molten glass passing thereover, the improvement comprising the addition of:
  (a) separate resistance heating elements in said lip only in the lip side portions extending along and adjacent to each of said sidewalls for controlling the transfer of heat between the delivery lip and the molten glass passing thereover by selectively applying heat particularly to the molten glass passing over said lip side portions and thereby maintain temperature uniformity throughout the glass flow and counteract the tendency of the glass to cool more at its edges than in the center, and
  (b) separate heat transfer means in each of said sidewalls for controlling the transfer of heat between said sidewalls and side edges only of said molten glass, where cooling tends to be greatest.

2. A method of forming a sheet of molten glass including the steps of flowing molten glass down an inclined delivery lip in the general form of a sheet, regulating the transfer of heat between the discharge end of said delivery lip and the lower surface of said molten glass and passing said molten glass between closely-spaced forming rollers to form said molten glass into a sheet, the improvement consisting essentially of the steps of simultaneously and selectively controlling the temperature of the molten glass passing over said lip by:
  (a) regulating the transfer of heat between the bottom surface of said molten glass and said delivery lip only in the side areas of said molten glass, by selectively applying heat, along side portions of the delivery lip, and by
  (b) regulating the transfer of heat along side edge areas of said molten glass through separate controlled heat application by applying additional heat only through sidewalls of the delivery lip, whereby a greater uniformity of temperature is maintained throughout the flowing glass and the danger of localized portions of the glass being either at too low or too high viscosities for proper forming or cold enough to devitrify is minimized.

References Cited

UNITED STATES PATENTS

| | | | |
|---|---|---|---|
| 1,605,736 | 11/1926 | Howard | 65—101 |
| 1,872,425 | 8/1932 | Drake | 65—101 |
| 3,348,937 | 10/1967 | Plumat | 65—101X |

S. LEON BASHORE, Primary Examiner

J. B. HARDAWAY, Assistant Examiner

U.S. Cl. X.R.

65—101, 186, 347, 356